United States Patent [19]

Currah, Jr.

[11] 4,411,588
[45] Oct. 25, 1983

[54] WIND DRIVEN POWER PLANT

[75] Inventor: Walter E. Currah, Jr., 4401 S. 64th St., Tacoma, Wash. 98409

[73] Assignee: Walter E. Currah, Tacoma, Wash.

[21] Appl. No.: 236,269

[22] Filed: Feb. 20, 1981

Related U.S. Application Data

[63] Continuation of Ser. No. 900,780, Apr. 28, 1978, abandoned.

[51] Int. Cl.³ .................................................. F03D 1/04
[52] U.S. Cl. ........................................ 415/2 A; 415/4
[58] Field of Search ................................ 415/2 A–4 A

[56] References Cited

U.S. PATENT DOCUMENTS

| | | | |
|---|---|---|---|
| 984,599 | 2/1911 | Pichault | 416/DIG. 4 |
| 1,025,428 | 5/1912 | Stanschus | 415/3 |
| 3,339,078 | 8/1967 | Crompton | 415/3 X |
| 3,883,750 | 5/1975 | Uzzell | 415/2 X |
| 4,021,135 | 5/1977 | Pedersen et al. | 415/2 A |
| 4,075,500 | 2/1978 | Oman et al. | 415/2 A X |
| 4,087,196 | 5/1978 | Kronmiller | 415/2 A |
| 4,132,499 | 1/1979 | Igra | 415/2 A |
| 4,182,594 | 1/1980 | Harper | 415/2 A |
| 4,258,271 | 3/1981 | Chappell et al. | 415/2 R |

FOREIGN PATENT DOCUMENTS

| | | | |
|---|---|---|---|
| 256035 | 11/1963 | Australia | 415/3 A |
| 546417 | 8/1922 | France | 415/4 A |
| 735040 | 11/1932 | France | 415/2 A |
| 1011132 | 6/1952 | France | 415/4 A |
| 2255809 | 7/1975 | France | 415/3 A |
| 162999 | 5/1921 | United Kingdom | 416/121 A |

Primary Examiner—Everette A. Powell, Jr.
Attorney, Agent, or Firm—Ziems & Walter

[57] ABSTRACT

A system for the conversion of wind energy to electric energy includes means for converting prevalent energy winds by use of the following: a "collecto-fin" that includes, from front to rear, a surface of a frustum of a right circular cone and one or more thin, flat circular rings to provide a difference in total pressure between the front and rear surfaces; an inner "stream-liner" that includes, from front to rear, a surface of a right circular cone, a surface of a cylinder, and a surface of a frustum of a right circular cone to conform to the slipstream boundary of the wind; an outer "stream-liner" that includes, from front to rear, a surface of a frustum of a right circular cone, a surface of a cylinder, and a surface of a right circular cone to conform to the slipstream boundary of the wind; and a wind turbine to conform to slipstream boundaries.

1 Claim, 5 Drawing Figures

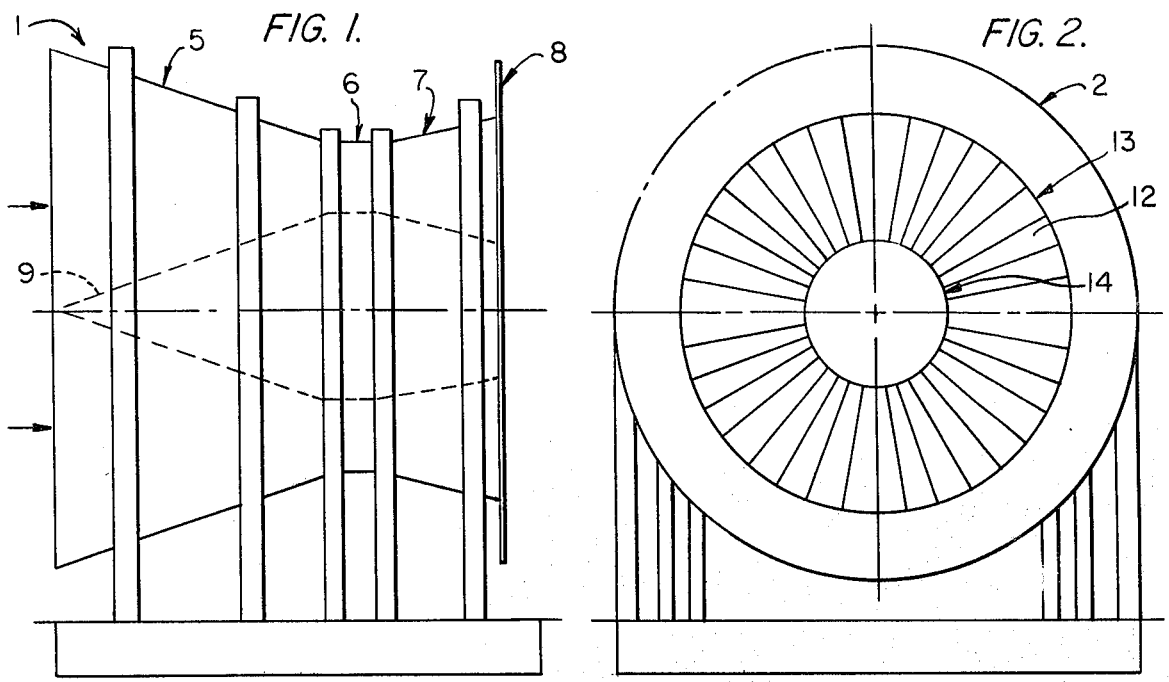
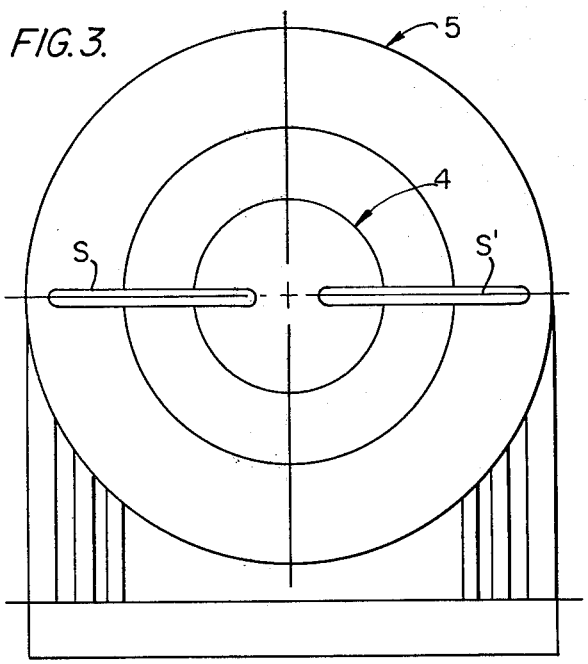
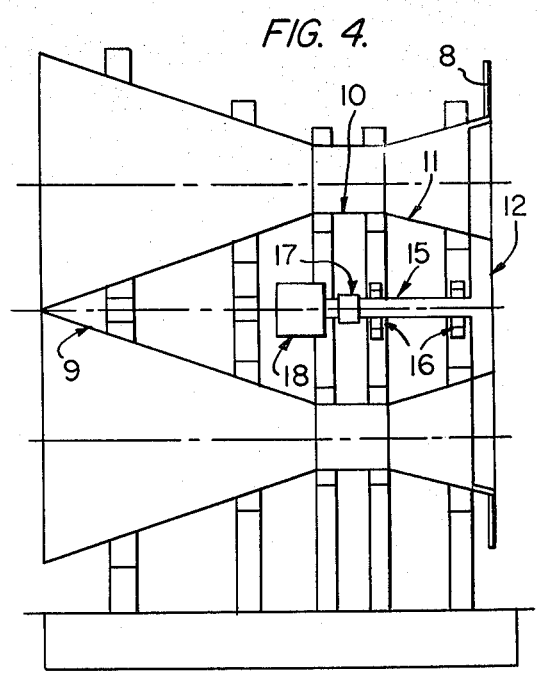
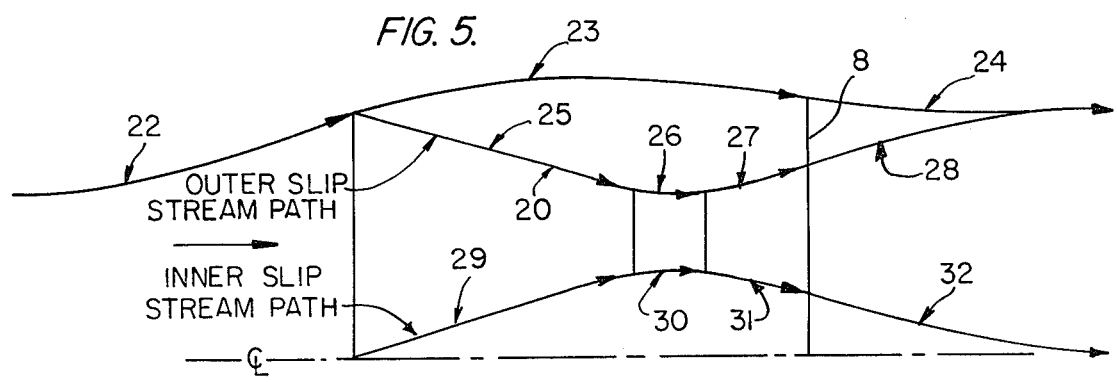

WIND DRIVEN POWER PLANT

This is a continuation of application Ser. No. 900,780, filed Apr. 28, 1978, now abandoned.

BACKGROUND OF THE INVENTION

Prevalent winds as defined herein depend on a specific location, and they move statistically most often in the same direction. For any given period, usually a month, a small percentage of these prevalent winds will contain the bulk of the available energy and are called energy winds.

In the United States prevalent energy winds, having a 10 m.p.h. or more average yearly wind velocity, occur in a north-and-south strip 350 miles wide midway between the Atlantic and Pacific Oceans, on the littoral of the Great Lakes, at the Atlantic Seaboard, the Gulf Coast, and the Pacific Ocean near San Francisco.

The first successful attempt in the United States at producing electric power to feed a utility network was in Vermont and used a two-bladed windmill mounted on a 150 foot tower. The 175 foot blades were pitch controlled and drove an AC alternator at constant speed. The 1,250 KW alternator produced 805 Kwh per KW per year over a 22½ day period of March 1945. One of the spars subsequently failed, and the project was abandoned.

All wind conversion systems that use pitch control are inefficient and failure prone. Two-bladed systems are classified as high speed windmills and must operate with a tip speed ratio of 5.5 during all wind velocities to provide efficient results. Large high-speed windmills develop high centrifugal forces during energy winds and must be shut down at times to prevent blade failure. The potential for blade damage is one reason for using pitch control.

Pitch control systems can be subject to blade flutter. An air foil is flutter free when small angles of attack are used. Systems using pitch control must withstand high dynamic loads due to flutter and must withstand high centrifugal loads due to the weight of extremely long blades.

A practical method for avoiding failure prone and inefficient systems is to use a multi-bladed turbine with constant pitch. A multi-bladed turbine can use an average angle of approach equal to 45° and an angle of attack under 4% for most wind velocities. Deutsches Reich Pat. No. 371,459 teaches the use of a multi-bladed turbine with constant pitch, but to my knowledge such a system has never been constructed.

There are three scientific principles that can be applied in evaluating wind driven energy systems. The first principle is that, during maximum power removal, the quantity of air passing through a wind energy system is reduced by one-half of the quantity that would flow across the same space if the system was not there. In fact, if the speed of the air is not reduced there is no power removal. Republique Francaise Pat. No. 1,098,995 is an example of a device that violates the first principle, and, of course, is not feasible.

The second principle is that a loss of static pressure occurs as air passes through a wind energy system. The magnitude of this pressure loss is a function of the Reynold's number. At small Reynold's numbers, the loss of static pressure is so high that the air will not flow. With Reynold's numbers of one million (1,000,000) or larger the static pressure losses are less than two percent, and the flow isn't prevented.

Any device mounted on a pole, tower, or small turntable with the exception of a windmill is not feasible because of high static pressure losses. Venturi tubes and shrouds are examples of devices that prevent flow if the device is too small.

The following patents are examples of devices that violate the second principle and are not feasible: U.S. Pat. Nos. (984,599), (1,345,022), (2,563,279), (3,740,565), (3,878,913), and (3,883,750); British Pat. No. 162,999; and Republique Francaise Pat. Nos. (546,417), (989,170), (1,011,132), and (1,098,995).

The third principle is that the change in pressure across a system is equal to, or greater than, the change in pressure through the system. The change in pressure across a system is in reference to the total pressure of the wind at the entry when subtracted by the static pressure of the air behind the system. The change in pressure through a system is in reference to the total pressure of the wind at the entry subtracted by the total pressure at the exhaust.

The pressure drop across a system can be maintained by controlling the slipstream of the wind moving around the system. The further a slipstream is moved away from a power plant, the greater the pressure drop. The pressure drop across a device is a function of the device's size and shape. A surface of a frustum of a right circular cone will give a higher pressure drop than a surface of a thick flat circular ring, and a surface of a frustum of a right circular cone fouled by one or more thick flat circular rings would provide a higher pressure drop than a surface of a frustum of a right circular cone for any given inner and outer radius.

The shape of a slipstream in front of a windmill is like a surface of a segment of a perboloid of revolution. When a windmill is placed inside the walls of a device, the walls must not interfere with the slipstream of the windmill. Interference will cause static pressure losses, and static pressure losses will cause the air to stagnate in front of the device and lead to system inefficiency.

When a windmill is placed in the entry of a venturi tube, the walls of the venturi tube interfere with the natural slipstream behind the windmill and cause static pressure loss.

British Pat. No. 162,999 and Republique Francaise Pat. Nos. 735,040 and 989,170 are examples of devices that will stagnate the wind because the wind cannot expand behind the blades.

When the slipstream of one device interferes with the slipstream of a second device, a static pressure loss will result. When a windmill is placed within the throat of a venturi tube, the natural slipstream in front of the windmill will interfere with the converging slipstream of the collector and cause static pressure loss. U.S. Pat. Nos. 984,599, 1,345,022, and 3,883,750; British Pat. No. 162,999; and Republique Francaise Pat. Nos. 546,417, 989,170, and 1,011,132 are examples of devices that will stagnate the wind, and the wind is accordingly prevented from accelerating.

The demand for electric power is increasing at an increasing rate, but the availability of domestic oil and natural gas for conversion to electric power is decreasing at an increasing rate. The number of coal fired and nuclear power plants being constructed annually is increasing at the maximum possible increasing rate, but it is not possible to keep up with the demand.

The United States must have new energy sources that can replace its oil and natural gas imports and help meet its demand. The wind is one of the few energy sources that is not being used effectively. Its availability is nearly unlimited and it is everlasting. What is needed is a wind driven power plant that can efficiently convert wind energy into electric power.

SUMMARY OF THE INVENTION

The present invention provides a wind driven power plant that uses a structure, termed herein as a "collecto-fin" to maintain a pressure drop across the system. The collecto-fin controls the slipstream size and prevents the slipstream from closing in on the wind flow through the system at the rear of the power plant.

The path of the slipstream in front of the collecto-fin is like a surface of a segment of a hyperboloid of revolution. The path of the slipstream in front of the system is caused to split into two slipstreams by the outer front edge of the collecto-fin.

The path of the slipstream across the collecto-fin is like the surface of a segment of an ellipsoid of revolution. The path of the slipstream in front of the collecto-fin and across the collecto-fin is continuous and the slopes of the surfaces of segments for both the above-mentioned hyperboloid and ellipsoid with a common plane, a plane also common to the front edge of the collecto-fin, are equal.

The path of the slipstream moving behind the collecto-fin is like a surface of a segment of a hyperboloid of revolution. The path of the slipstream across and behind the collecto-fin is continuous and the slopes of the surfaces of segments for both the aforementioned ellipsoid and hyperboloid with a common plane, a plane also common to the rear surface of the collecto-fin are equal.

The flow of the wind in front of the collecto-fin is divergent. The wind makes a transition from a divergent flow to a convergent flow as it crosses the collecto-fin. The velocity of the wind beyond the slipstream will remain constant, but with some variance adjacent to the slipstream. The air between the slipstream and power plant will remain stagnant.

A wind driven power plant in accordance with the present invention uses two structural devices to accelerate the wind and to protect the slipstreams from eddy currents, these devices being termed herein the inner and outer "stream-liners." Acceleration of the wind will cause static pressure loss, but the loss will be less than two percent of the pressure drop across the system because the Reynold's number for the system will be larger than one million (1,000,000) even for the smallest wind velocities.

The wind passing through the power plant has two slipstreams, an outer and inner slipstream. The outer slipstream is split off of the slipstream in front of the collecto-fin by the outer front edge of the power plant, and is converged by the inside wall surface of the outer stream-liner structure. The path of the outer slipstream lies adjacent to the inside wall surfaces of the outer stream-liner structure.

The inner slipstream is created by the outer wall of the inner stream-liner structure. The path of the inner slipstream is converged by the outer wall of the inner stream-liner, and the path of the inner slip-stream lies adjacent to the outer wall surfaces of the inner stream-liner structure.

The path of the outer stream-liner through the throat of the inner and outer stream-liner is like the surface of a hyperboloid of one sheet. The path of the inner slipstream through the throat of the inner and outer stream-liner is like the surface of a segment of an ellipsoid. The flow of the wind passing through the throat of the inner and outer stream-liner is transformed from convergent flow to divergent flow.

The path of the outer slipstream between the inner and outer stream-liner, and between the throat and turbine positioned in the wind path, is like the surface of a segment of a hyperboloid of revolution. The path of the inner slipstream between the inner and outer stream-liner, and between the throat and turbine, is like the surface of a segment of a paraboloid of revolution. The wind flow passing through the power plant is divergent flow between the throat of the inner and outer stream-liner and the blade row of the turbine.

The path of the outer slipstream behind the tips of the turbine blades is like a surface of a segment of a paraboloid of revolution. The path of the inner slipstream behind the roots of the turbine blades is like a surface of a hyperboloid of revolution. The outer slipstream behind the tips of the turbine and the slipstream of the wind flowing across the collecto-fin converge downstream from the power plant. The slipstream behind the roots of the turbine blades converges to a line downstream from the power plant.

A wind driven power plant in accordance with the present invention uses a multi-bladed fixed pitched wind turbine. The average angle of approach for the blades is preferably 45°. The blades are attached individually to a hub. The hub is mounted securely to a shaft that is cantilevered behind two bearing housings located internally of the inner stream-liner. The shaft is supported by the two bearings and is coupled to one or more serially arranged DC generators or the like. The field current in the DC generator(s) is varied to provide maximum power removal from the wind for all wind velocities.

BRIEF DESCRIPTION OF THE DRAWINGS

FIG. 1 is a side view of the power plant showing the relationship between the collecto-fin, outer stream-liner, and supporting structure and the inner stream-liner (broken-line illustration).

FIG. 2 is a rear view of the power plant of FIG. 1 showing the physical relationship between the collecto-fin, turbine components, and supporting structure.

FIG. 3 is a front view of the power plant of FIG. 1 showing the relationship between the collecto-fin, inner stream-liner and the supporting structure.

FIG. 4 is a cross sectional view taken from the plane of symmetry showing the relationship between the inner and outer stream-liner, supporting structure, and rotational components.

FIG. 5 is a diagramic sectional view of the upper quadrant of the slipstream paths showing the path of the slipstream across the collecto-fin and the path of the inner and outer slipstreams between the inner and outer stream-liners.

DETAILED DESCRIPTION OF THE DRAWINGS

The terms "collecto-fin" and "stream-liner" are descriptive words defined herein.

In FIG. 1 the wind driven power plant 1 is shown in a side view to show the relative positioning of its outside components. The collecto-fin is a combination of a surface of a frustum of a right circular cone 5 and an edge of a thin flat ring 8, which are not necessarily connected directly. The outer stream-liner is shown as a surface of a frustum of the right circular cone 5, as a surface of an intermediate cylinder 6, and as a surface of a right circular cone 7. The front or forward facing edge of the surface of a frustum of a right circular cone 5 splits the slipstream 22 (FIG. 5) in front of the collecto-fin. One of the slipstreams 23 (FIG. 5) moves across the collecto-fin, and the other slipstream 25, 26, and 27 (FIG. 5) moves adjacent to the inner surfaces of the outer stream-liner defined by the aforementioned right circular cone frustrums 5 and 7 and the intermediate cylinder 6. The outer surface of the outer "stream-liner" prevents eddy currents from interfering with the flow through the power plant 1.

In FIG. 2 the power plant 1 is shown in a rear view to show a wind turbine 12 and the rear of the flat ring 8 of the collecto-fin defined by the aforementioned right circular cone frustrum 5 and cooperating ring 8. The wind turbine 12 is a multi-bladed, high torque wind wheel that uses fixed pitched blades 13 attached to a central hub 14.

In FIG. 3 the power plant 1 is shown in a front view to show the front edge of the collecto-fin that is, the front edge of the cone 5 the front of the inner stream-liner 4. Horizontal element S and S' between the inner wall of the outer stream-liner 3 and the outer wall of the inner stream-liner are provided to effect positioning and support thereof.

In FIG. 4 the power plant 1 is shown in a sectional view to show the relative positioning of the interior components. The inner stream-liner, generally designated by the reference character 4, is shown as a surface of a forwardly located right circular cone 9, as a surface of an intermediate cylinder 10, and as a surface of a frustum of a rearwardly located right circular cone 11. The turbine 12 is attached to a shaft 15 and is canti-levered behind two bearings 16 that support the shaft 15. The shaft 15 is attached to a DC generator 18 by means of a coupling 17. The front of the inner stream-liner 4 (that is, forwardly facing cone 9) separates the flow and creates an inner slipstream which moves adjacent to the outer surfaces of the inner stream-liner 4. The field current in the direct current generator 18 is varied for maximum power removal from the wind.

In FIG. 5 a diagramic sectional view of the upper quadrants above the center line $\mathcal{C}$ shows the slipstream's path 22, 23 and 24 across the collecto-fin, the outer slipstream's path 25, 26, 27 and 28 and the inner slipstream's path 29, 30, 31 and 32. The slipstream path 22, 23 and 24 across the collecto-fin is shown as a filament of a segment of a hyperboloid of revolution 22, as a filament of a segment of an ellipsoid of revolution 23, and as a filament of a segment of a hyperboloid of revolution 24.

The outer slipstream path 25, 26, 27 and 28 is shown as a filament of a frustum of a right circular cone 25, as a filament of a hyperboloid of one sheet 26, as a filament of a hyperboloid of revolution 27, and as a filament of a paraboloid of revolution 28. The inner slipstream path 29, 30, 31, and 32 is shown as a filament of a right circular cone 29, as a filament of an ellipsoid 30, as a filament of a segment of a paraboloid 31, and as a filament of a segment of a hyperboloid 32.

The illustrated embodiment can be varied within the scope of the invention. In particular, it is possible to vary the shape and number of fins used for the collectofin. Also, the size of the throat between the inner and outer "stream-liners" can be varied to take advantage of the average wind velocity at a given location.

Although, a particular embodiment of the invention has been disclosed above for illustrative purposes, it will be understood that variations or modifications thereof which lie within the scope of the appended claims are contemplated.

I claim:

1. An apparatus for converting wind energy to electrical energy, said apparatus comprising:
an inner and an outer housing both formed as surfaces of revolution about a common longitudinally extending axis to define therebetween a forwardly facing wind entry opening and entry chamber, an intermediate wind chamber, and a rearwardly facing wind expansion chamber and wind exit opening; said outer housing defined by a frustrum of a first outer right circular cone oriented along said longitudinally extending axis with its larger open end defining said wind entry opening, an outer cylinder connected to the smaller end of said frustrum, and a frustrum of a second outer right circular cone oriented along said longitudinally extending axis with its smaller end connected to said cylinder and its larger end defining said wind exit opening, and a flat radially extending annular plate connected to the rearwardly facing end of the frustrum of said second right circular cone in a plane normal to the longitudinal axis for providing an increased pressure differential between said wind entry and exit openings; said inner housing defined by a first inner right circular cone concentric with and coextensive with said first-mentioned outer right circular cone and oriented along said longitudinally extending axis with its smaller end facing in the direction of said wind entry opening to define said wind entry chamber therebetween, an inner cylinder concentric with and coextensive with said outer cylinder and connected to the larger end of said first inner right circular cone to define said intermediate chamber, and a conically converging member having its larger end connected to said inner cylinder member to define, with said second outer right circular cone, the wind expansion chamber; at least one turbine rotor blade row and hub assembly mounted in said wind expansion chamber at the rearward end of the frustrum of said second right circular cone for rotation about said longitudinally extending axis in a plane normal to the longitudinal axis, said blade row axially positioned so that said flat radially extending annular plate lies in a plane between the forward and rearward edges of said blade row; said blade row and hub assembly connected to an electrical energy generator means mounted within said inner housing for generating electricity in response to rotation of said turbine rotor; and support means connected between said inner and outer housings.

* * * * *